June 17, 1952  R. E. KELLER  2,601,151
POWER TRANSMISSION MECHANISM
Filed June 7, 1948  3 Sheets—Sheet 1
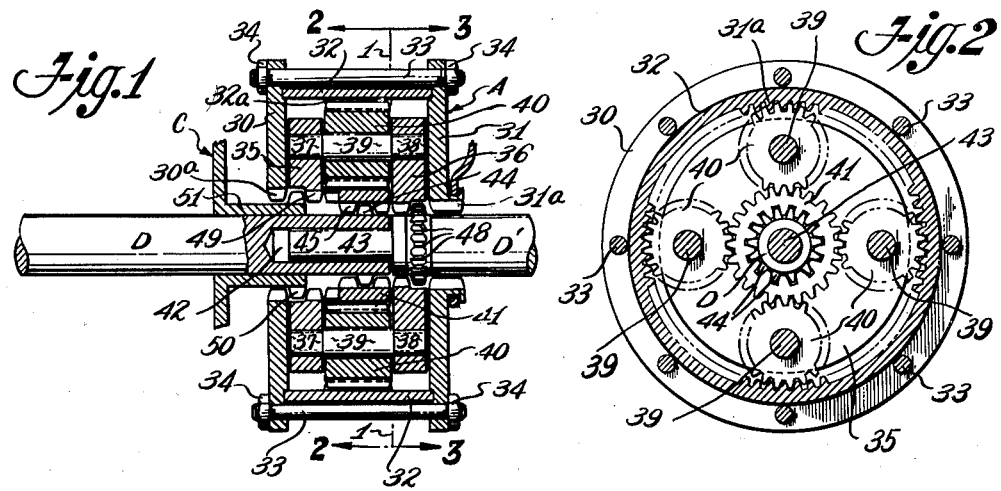
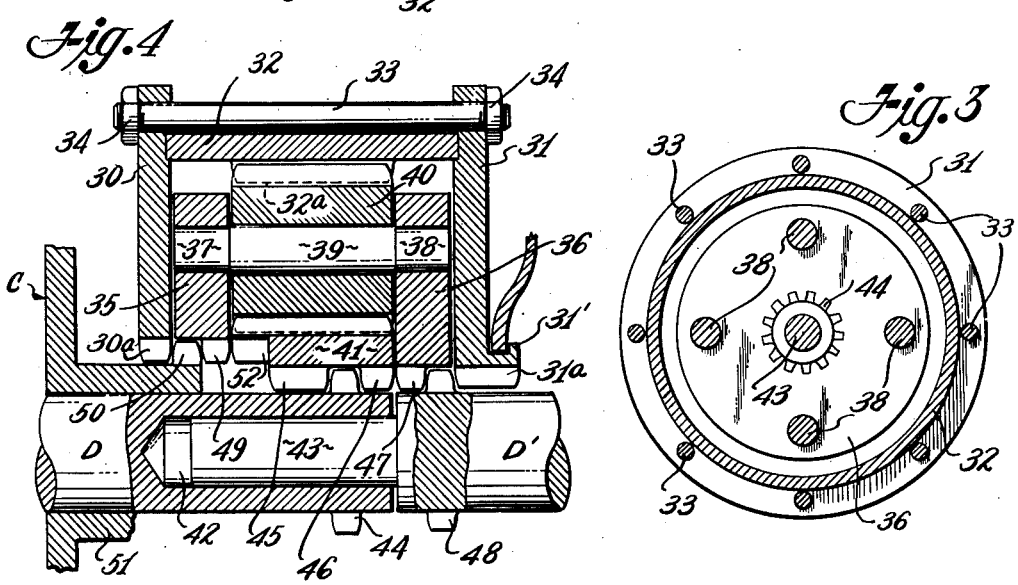
Fig.5
| DRIVES | GEARS MESHED |
|---|---|
| DIRECT | D-44-45-41-46-48-D' |
| LOW | D-44-45-41-40-39-47-48-D' (30 FIXED TO CASE THRU 30a-50) |
| NEUTRAL | OUT OF MESH AS SHOWN |
| REVERSE | D-44-46-41-40-32a-31a-48-D' (39 FIXED TO CASE THRU 49-50) |
| OVERDRIVE | D-44-47-39-40-32a-31a-48-D' (41 FIXED TO CASE THRU 52-50) |
INVENTOR.
REX E. KELLER
BY Luther L. Mack
Attorney

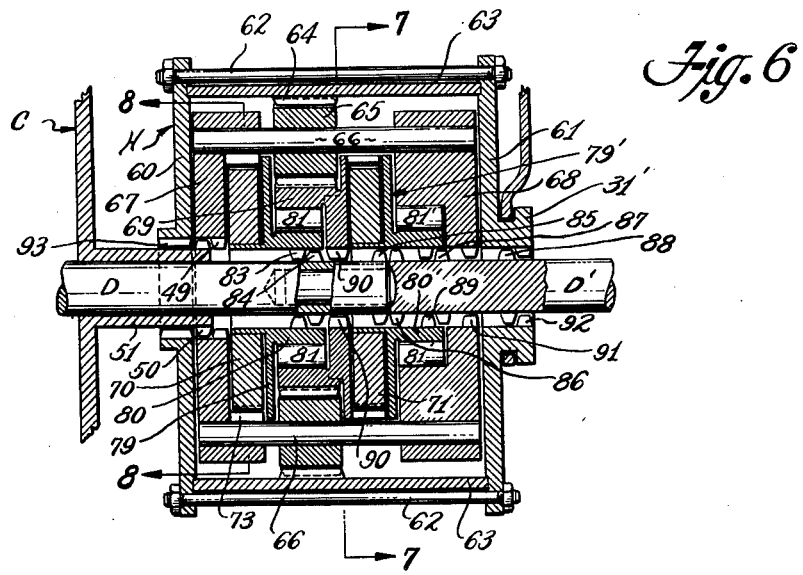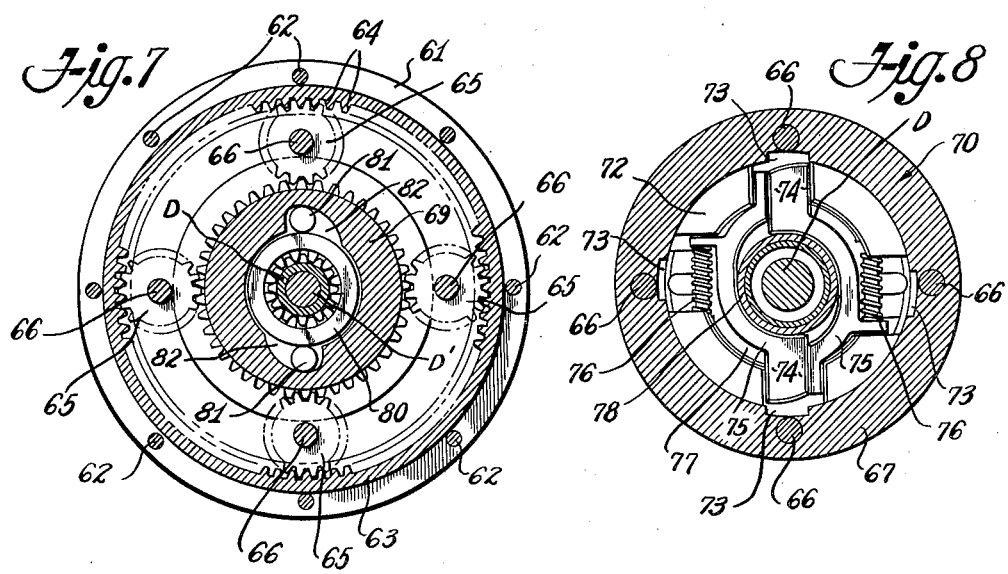

June 17, 1952          R. E. KELLER          2,601,151
POWER TRANSMISSION MECHANISM
Filed June 7, 1948          3 Sheets-Sheet 3
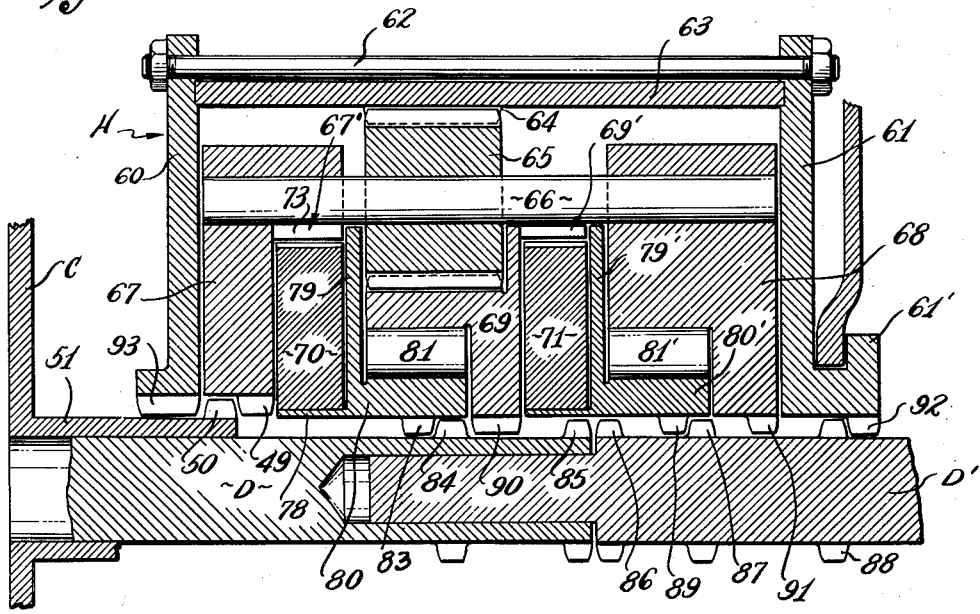
Fig. 9
Fig. 10
| GEAR RATIO | | GEARS MESHED |
|---|---|---|
| 1. | AUTO.-1ST STAGE | D-84-83-80-81-69-65-66-68-81'-80'-89-87-D' (64 FIXED TO CASE THRU 60-93-50 & 51) |
| 1a. | AUTO. 2ND STAGE | D-84-83-80-70-67'-67-66-68-81'-80'-89-87-D' (CLUTCH-81 FREEWHEELS) |
| 1b. | AUTO. 3RD STAGE | D-84-83-80-70-67'-67-66-65-69-69'-71-80'-89-87-D' (81 & 81' FREEWHEEL) |
| 2 | NEUTRAL | POSITION ILLUSTRATED |
| 3 | REVERSE | D-84-90-69-65-64-61-92-88-D' (67 FIXED TO CASE THRU 49-50) |
| 4 | POSITIVE HIGH | D-85-90-86-D' |
| 5 | POSITIVE LOW | D-85-90-69-65-66-68-91-88-D' (H FIXED TO CASE THRU-93-50) |
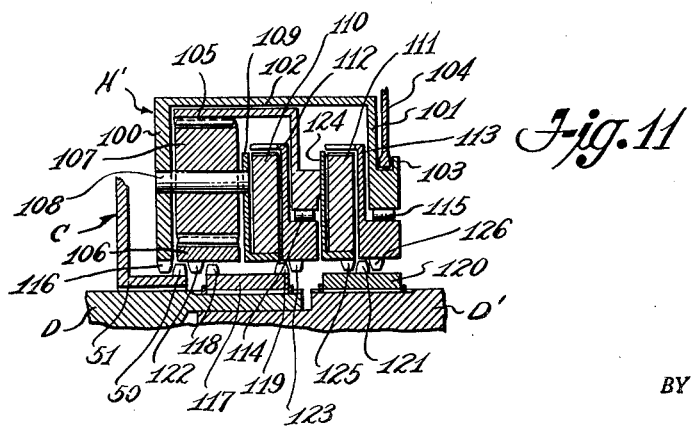
Fig. 11
INVENTOR.
REX E. KELLER
BY
Luther Mack
Attorney Patented June 17, 1952

2,601,151

UNITED STATES PATENT OFFICE 2,601,151

POWER TRANSMISSION MECHANISM

Rex E. Keller, Beverly Hills, Calif.

Application June 7, 1948, Serial No. 31,532

18 Claims. (Cl. 74—752)

1

This invention relates in general to power transmission mechanisms but particularly to and has for an object the provision of an automotive transmission mechanism of simple and economical design capable of ready application to and use on modern motor vehicles and particularly embodying a single planetary gear unit for use in connection with ordinary clutches, and particularly with single or double stage fluid coupling units and providing low, direct, overdrive, neutral, and reverse stages, and automatic low, direct, and overdrive and return.

Other and more detailed objects of my invention will appear as the description of my improved mechanism progresses.

I have shown a preferred type of mechanism embodying my improvements and certain modifications thereof in the annexed drawings, subject to further modification, within the scope of the appended claims, without departing from the spirit of the invention.

In said drawings:

Fig. 1 is a sectional view of a simple form of transmission mechanism in a plane cutting the main axis of the unit;

Fig. 2 is a transverse section of the same in a plane 1—1 of Fig. 1, as viewed in the direction of arrows 2, 2;

Fig. 3 is a section in plane 1—1 of Fig. 1, as seen in the direction of arrows 3, 3;

Fig. 4 is an enlarged fragmentary section in the plane of Fig. 1;

Fig. 5 is a table indicating elements of the unit of Figs. 1 and 4 differently connected to provide different gear ratios and speeds, the connected elements being indicated by reference characters in the table;

Fig. 6 is a section on a plane cutting the main axis and showing a modified form of transmission employing automatic and overdriving clutch or clutches and other features differing from the structure and arrangement of Fig. 1;

Fig. 7 is a transverse section on line 7—7 of Fig. 6;

Fig. 8 is a transverse section on line 8—8 of Fig. 6, showing details of a typical automatic clutch;

Fig. 9 is an enlarged partial section of the structure of Fig. 6;

Fig. 10 is a table of gear connections between the several elements of the form of transmission shown in Figs. 6 and 9; and Fig. 11 is a partial section of a still different form of mechanism in the plane of its main axis using the sun gear anchored to the case instead

2 of the orbit gear for leverage purposes in underdrive and overdrive.

A characteristic common to all of the forms of transmission mechanism shown is the provision of but a single planetary gear unit, suitable means for shifting some of the elements relative to others and arrangement and means for operatively connecting all forms to an ordinary clutch or a fluid coupling unit, if desirable.

Initially, I will describe the form of mechanism shown in Figs. 1 to 4, inclusive, with reference also to Fig. 5, as follows: The unit is assembled in a case A formed of circular end walls 30 and 31 and a cylindrical wall 32 held fixedly on the end walls by bolts 33 and nuts 34 so as to mount the complete unit concentrically relative to a driving shaft D and a driven shaft D'. End walls 30 and 31 have internal teeth 30a and 31a, respectively, and member 32 has internal orbit gear 32a. Inwardly of and immediately adjacent end walls 30 and 31 are similar pinion carrier discs 35 and 36 which are bored to receive opposite ends 37 and 38 of a plurality of shafts 39 on which planet gears 40, 40 are mounted for rotation. A sun gear 41 is carried on driving shaft D and is adapted to mesh constantly with planet gears 40 while said planet gears also mesh with orbit gear 32a, thereby composing a complete planetary gear set.

Driving shaft D is bored at 42 to telescopically receive a concentric reduced extension 43 of driven shaft D' and is formed with external teeth 44, adapted to selectively engage internal teeth 45 and 46 formed on sun gear 41. Carrier disc 36 has internal teeth 47 thereon and driven shaft D' has external teeth 48 adapted to selectively mesh with teeth 47 or 31a.

Carrier disc 35 has internal teeth 49 adapted at times to mesh with external teeth 50 on an extension 51 from the case C. Thus, when the unit is bodily shifted longitudinally of the driving-driven shaft axis the several elements are interconnected, in the manner shown in Fig. 5, and as hereinafter more fully explained, for establishing different gear ratios and correspondingly different speeds and direction of rotation of the driven shaft.

It will be observed, therefore, that when the unit is bodily shifted to the right as seen in Figs. 1 and 4, the driving teeth 44 of shaft D will engage the remote portion of internal teeth 45 of sun gear 41 while the teeth 48 of driven shaft D' will engage with internal teeth 46 of sun gear 41, thereby providing a direct driving connection between shafts D and D' and permitting bodily rotation of the unit with said shafts. As shown in Figs. 1 and 4, the unit is shown in neutral position with teeth 44 unmeshed from teeth 45 and 46 of the sun gear.

A low gear connection between shafts D and D' is obtained by shifting the unit A to the right to an extent only necessary to engage teeth 44 with teeth 45 and teeth 47 with teeth 48, simultaneously, thereby driving through sun gear 41, pinions 40, orbit gear 32a and carrier 36, orbit gear 32a being fixed to case C by meshing of teeth 30a and 50.

For providing a reverse gear drive the unit A is shifted to the left so that case C will be connected with carrier 35 through elements 49 and 50; shaft D will be connected through teeth 44 and 46 with sun gear 41; and through sun gear 41 and planet gears 40 with ring gear 32a, and thence through end wall 31 and its teeth 31a and teeth 48 with driven shaft D'.

My transmission may be adjusted to overdriving connection between shafts D and D' by bodily shifting unit A to the left as shown in Figs. 1 and 4, so as to mesh teeth 44 with carrier teeth 47, end gear teeth 31a with driven toothed member 48, and spur teeth 52 on sun gear 41 with case teeth 50. In such event, sun gear 41 is fixed to the case while the planet gears are rotated through carrier 36 and power is applied to shaft D' through orbit gear 32a and teeth 31a.

Now, referring to Figs. 6, 7, 8, and 10 it will be observed that I have provided a somewhat different form of mechanism from that shown in Figs. 1 and 4, although similar results are accomplished in a slightly different manner. This optional form includes a housing H with end walls 60 and 61 held together by bolts 62, an outer circular wall 63 bearing an internal set of teeth 64 to form a ring or orbit gear, planet gears 65 carried on spindles 66 and spacedly connecting carrier discs 67 and 68, a sun gear 69, a pair of centrifugal clutches 70 and 71 of a well known type, and a pair of overrunning clutches 81 and 81', all of which elements are adapted for selective interconnection when certain elements of the unit are bodily shifted, for providing different driving ratios with the driven shaft. Shafts D and D' are partly telescopic as in Fig. 1. Carrier disc 67 has internal gear teeth 49 adapted to engage case gear teeth 50 on case C as in Fig. 1, and is recessed at 72 on its inner side to snugly receive the clutch unit 70. The wall of said recess has a plurality of grooves 73 which are adapted at times to receive clutch portions 74 diametrically extended from bodies 75 and which are normally urged inwardly into non-clutching positions by springs 76 but are thrust outwardly toward clutching positions by accelerating the speed of the clutch bodies 75 (Fig. 8). This type of clutch is well known and two forms thereof are illustrated in patents No. 2,236,549 and No. 2,182,385, but any other type of automatic clutch may be here used.

The inner driving member 77 of the clutch has a hub 78 embracing driving shaft D and a web 79 operatively supports members 75. Web 79 has a hub 80 extended concentrically into and freewheelingly connected with sun gear 69 through rollers 81 operating in inclined peripheral recesses 82 of usual character, thereby permitting differential rotation of carrier 67, clutch member 77, and sun gear 69.

Clutch member 77 has internal teeth 83 adapted at times to engage teeth 84 on shaft D. Shaft D also has teeth 85 spaced to the right as seen in Fig. 5, from teeth 83, whereas the coaxial driven shaft D' has teeth 86, 87, and 88 formed spaced apart thereon. The web of sun gear 69 has internal teeth 90; clutch member 79' at its hub 80' has teeth 89; carrier 68 has internal gear teeth 91; and end wall 61 has internal teeth 92, and end wall 60 has internal teeth 93 thereon, by means of which said sun, planet, and orbit gears, the elements of the transmission may be selectively interconnected for affording different gear ratios to vary the torque applied to and direction of rotation of the driven shaft D'. Free wheeling rollers 81' similar to those shown at 81 are employed between clutch 71 and carrier disc 68 and are such as are shown in Fig. 7.

As indicated in the table of Fig. 10, this type of transmission provides three stages of automatic operation plus neutral, positive reverse, positive high, and positive low stages. The elements shown in Figs. 6 and 9 are relatively in neutral positions.

Referring to Fig. 9, it will be noted that carrier 67 serves as a drum for clutch 70 while sun gear 69 serves as a drum for clutch 71, said carrier 67 and sun gear having rims 67' and 69', respectively, with recesses 73 (Fig. 8) therein for receiving the clutch elements 74.

Automatic first stage is effected by shifting unit H to the right as seen in Fig. 9, thereby meshing driving teeth 84 with clutch teeth 83, and imparting forward motion through member 80 and free wheeling clutch 81 to sun gear 69, thence through pinions 65 and shaft 66 to carrier discs 67 and 68, thence through free wheeling clutch 81' to member 80' of clutch 71 and through teeth 89 and teeth 87 to shaft D', the member 60 being fixed to case C by engagement of teeth 50 and 93.

A second automatic stage is obtained by this same shift with teeth 84 and teeth 83 and teeth 89 and teeth 87 engaged, but through the driving of member 80 of automatic clutch 70 which becomes automatically operative above certain speeds, the carrier 67 is rendered directly operative and the driving connection with shaft D' being maintained through shaft 66, carrier 68, free wheeling clutch 81', member 80' of clutch 71 and teeth 89 and teeth 87. In this stage clutch 81 free wheels.

A third automatic stage is obtained while the driving connection remains through teeth 84—83, automatic clutch unit 70, through member 80, carrier 67, shaft 66, pinions 65, sun gear 69, thence through automatic clutch 71, member 80' and teeth 89—87, to shaft D'. In this instance both clutches 81 and 81' free wheel, but the overdrive connection is positive.

Reverse gear connections are established by shifting unit H to the left and engaging internal teeth 90 with driving teeth 84 and teeth 49, 50 and teeth 92 with driven teeth 88. Thus, the sun gear rotates forwardly while the carriers 67 and 68 are fixed to case C and orbit gear 64 and housing H rotates reversely for imparting reverse rotation to driven shaft D' through teeth 92 and 88.

A positive high gear connection is effected by shifting unit H to the right until sun gear 69, through its internal teeth 90 engages both sets of teeth 85 and 86 which are carried on shafts D and D', respectively.

A positive low gear driving connection is obtained by shifting H to the right to an extent which will engage teeth 90 with teeth 85, and teeth 93 with teeth 50 of the case, and teeth 91 with teeth 88; thereby imparting motion to driven shaft D' through sun gear 69, shaft 66, and carrier 68 to shaft D'.

For shifting unit A of Figs. 1 and 4 and unit H of Figs. 6 and 9, bodily, a shift collar 31' or 61' as the case may be, is provided at an end of the housing for receiving a conventional shifting yoke.

Fig. 11 illustrates a third form of mechanism embodying similar elements but arranged differently than corresponding elements of the previously described forms, although the sun gear instead of the orbit gear is connected to the case, and effects similar operation. In this instance, a suitable housing H' is provided with end walls 100 and 101 joined by a circular wall 102, end 101 being shown with a shift collar 103 adapted to receive a shifting member 104.

In said housing is mounted an orbit gear 105, sun gear 106, pinions 107 on shafts 108 connected with a member 109, a pair of automatic clutches 110 and 111 including drums 112 and 113, respectively, and free wheeling clutches 114 nad 115, respectively, which are provided between clutch member 112 and orbit gear 105 and clutch member 113 and wall 101 of housing H'.

Wall 100 has teeth 116 adapted at times to engage teeth 50 on extension 51 of case C and bears ends of pinion shafts 108 so that together with member 109 the pinions are operatively separated for connecting sun gear 106 with orbit gear 105. Hence, the housing H', pinions 107, and member 109 rotate planet-like and together around sun gear 106 while orbit gear 105 in this case is independent of the housing. Shaft D carries a member 117 formed with spaced sets of teeth 118 and 119 while driven shaft D' has a member 120 thereon formed with a single set of teeth 121.

Sun gear 106 has internal teeth 122 clutch member 112 has internal teeth 123, a member 124 is fixed to orbit gear 105 and has internal teeth 125, and member 113 has internal teeth 126 thereon for selective engagement with said teeth on the driving and driven shafts D and D'. Members 109 and 124 constitute the supporting members for the clutch elements of the automatic clutches 110 and 111 (similar to Fig. 8), while members 112 and 113 constitute the outer or driven members of said clutches.

In the mechanism of Fig. 11, the sun gear 106 is adapted to be connected with case C through teeth 122—50 and thus held against rotation and orbit gear 105 overruns driven element (drum) 112 of clutch 110, and the driving element of clutch 110 always rotates with housing H' and pinions 107. The driving element 124 and driven element 113 are selectively engageable with driven shaft D' through teeth 125 or 126 and teeth 121, while housing H' and element 109 free-wheel on element 113. Thus, the unit H' rotates at a speed less than high ratio and drives shaft D' through clutches 110 and 111.

Shifting of unit H' is made bodily by means of member 104 with the enclosed elements—to the left for forward automatic shifting and overdriving, and to the right for reverse driving of shaft D'. When in automatic low, direct and overdrive arrangement the drive is through teeth 119, 123, members 112, 114, 105, pinions 107, members 100, 101, 115, teeth 126, 121, members 120, D'. Direct and overdriving characteristics are provided by clutches 110 and 111 moving independently of each other, or together.

In reverse gear, unit H' having been shifted to the right the planetary carrier is held against rotation through teeth 116 and teeth 50 while sun gear 106 is driven through teeth 118—122. Orbit gear 105 imparts reverse motion to D' through 124, teeth 125, 121, and member 120.

Of course, it will be understood that while I have herein shown and described the unit A and its included elements as commonly shiftable relative to elements on shafts D and D' said shafts or the elements thereon may as well be shiftable relative to said unit for changing operating conditions of the mechanism, or connections could be made by employment of ordinary shift collars.

I claim:

1. A power transmission mechanism comprising: coaxial driving and driven shafts, a stationary case and a gear changing unit including a housing, a single planetary gear set within the housing embodying sun, planet, and orbit gears, and a planet gear carrier, and means associated with said planetary set and said shafts and arranged for selective interconnection in response to the relative shifting of the planetary elements and the elements on said shafts and on said case, for varying the torque applied to the driven shaft, and a centrifugal clutch operatively connecting the sun gear and carrier of the planetary gear set upon the attainment of synchronization between the driving and driven elements of said clutch.

2. A power transmission mechanism comprising: coaxial driving and driven shafts, a stationary case and a gear changing unit including a housing, a single planetary gear set within the housing embodying sun, planet, and orbit gears, and a planet gear carrier, means associated with said case, carrier, sun, and orbit gears and said shafts arranged for selective interconnection in response to the relative shifting of the planetary elements and the elements on said shafts and on said case, for varying the torque applied to the driven shaft, a centrifugal clutch operatively connecting the sun gear and carrier of the planetary gear set upon the attainment of synchronization between the driving and driven elements of said clutch, and an overrunning clutch operatively connecting one of the elements of the centrifugal clutch and one of the driving gears of the planetary set.

3. A power transmission mechanism comprising: coaxial driving and driven shafts, a stationary case and a gear changing unit including a housing, a single planetary gear set within the housing embodying sun, planet, and orbit gears, and a planet gear carrier, and means associated with said case, carrier, sun, and orbit gears and said shafts arranged for selective interconnection in response to the relative shifting of the planetary elements and the elements on said shafts and on said case, for varying the torque applied to the driven shaft, and a centrifugal clutch embodying driving and driven elements adapted at times to be locked together, a free wheeling clutch connecting said driven element with the planet gear carrier of the planetary set and therethrough to the driven shaft and means for positively connecting the driving element of the free wheeling clutch with the driving shaft.

4. A power transmission mechanism comprising: coaxial driving and driven shafts, a stationary case, and a gear changing unit including a housing, a single planetary gear set within the housing embodying sun, planet, and orbit gears, and a planet gear carrier, and means associated with said case, carrier, sun, and orbit gears and with said shafts arranged for selective interconnection in response to the relative shifting of the planetary elements and the elements on said shafts and on said case, for varying the torque applied to the driven shaft, and a centrifugal clutch free-wheelingly connected with the sun gear of the planetary set and means for positively connecting the driving element of the free wheeling clutch with the driving shaft.

5. A power transmission mechanism comprising: coaxial driving and driven shafts, a stationary case into which the driving shaft extends for operative connection with a motor, a variable speed unit including a housing and a planetary gear set enclosed by said housing and including a sun gear, an orbit gear fixed to said housing, a planet gear carrier and planet gears borne by said carrier and permanently connecting the sun gear with the orbit gear, said case having a circumferentially toothed extension embracing the drive shaft and arranged for selective connection at times with said housing, said carrier and said sun gear, clutch teeth on said driven shaft arranged for selective connection with clutch teeth on said carrier and on said housing, said housing and the gears enclosed thereby being shiftable bodily together axially of said shafts, for driving the driven shaft at different speeds as influenced by the shifted position of the unit.

6. A power transmission mechanism as set forth in claim 5 in which: the shifting of said unit in one direction will lock the housing of the unit to the case against rotation and operatively connect the planetary set through the sun gear and the carrier with the driven shaft and provide a direct driving connection between said shafts.

7. A power transmission mechanism as set forth in claim 5 in which: the shifting of said unit in one direction will lock the housing of the unit to the case against rotation and operatively connect the planetary set through the sun gear and the carrier with the driven shaft and provide a direct driving connection between said shafts, and when said unit is reversely shifted will lock said carrier against rotation and rotate the orbit gear and housing and operatively connect said shafts to provide speeds of less than one to one ratio.

8. A power transmission mechanism comprising: coaxial driving and driven shafts, a stationary case into which the driving shaft extends for operative connection with a motor, a variable speed unit including a housing and a planetary gear set enclosed by said housing and including a sun gear, an orbit gear fixed to said housing, a planet gear carrier and planet gears borne by said carrier and permanently connecting the sun gear with the orbit gear, said case having a circumferentially toothed extension embracing the drive shaft and arranged for selective connection at times with said housing, said carrier and said sun gear, clutch teeth on said driven shaft arranged for selective connection with clutch teeth on said carrier and on said housing, said housing and the gears enclosed thereby being shiftable bodily together axially of said shafts, for driving the driven shaft at different speeds as influenced by the shifted position of the unit, said carrier including spaced but cross-connected members with the planet gears therebetween, a centrifugal clutch including a driving member drivingly engageable with the driving shaft and a driven member rotatable with the carrier whereby when the driving and driven members of the centrifugal clutch are in synchronism said driving member and said carrier will be locked for rotation together.

9. A power transmission mechanism comprising: coaxial driving and driven shafts, a stationary case into which the driving shaft extends for operative connection with a motor, a variable speed unit including a housing and a planetary gear set enclosed by said housing and including a sun gear, an orbit gear fixed to said housing, a planet gear carrier and planet gears borne by said carrier and permanently connecting the sun gear with the orbit gear, said case having a circumferentially toothed extension embracing the drive shaft and arranged for selective connection at times with said housing, said carrier and said sun gear, clutch teeth on said driven shaft arranged for selective connection with clutch teeth on said carrier and on said housing, said housing and the gears enclosed thereby being shiftable bodily together axially of said shafts, for driving the driven shaft at different speeds as influenced by the shifted position of the unit, said carrier including spaced but cross-connected members with the planet gears therebetween, a centrifugal clutch including a driving member drivingly engageable with the driving shaft and a driven member rotatable with the carrier whereby when the driving and driven members of the centrifugal clutch are in synchronism said driving member and said carrier will be locked for rotation together, and a free wheeling clutch between the driving member of the centrifugal clutch and said sun gear, so that at times the driven shaft may over run the driving shaft through the connection of the carrier with the driven shaft and the connection of the driving member of said centrifugal clutch with the driving shaft.

10. A power transmission mechanism comprising: coaxial driving and driven shafts, a stationary case into which the driving shaft extends for operative connection with a motor, a variable speed unit including a housing and a planetary gear set enclosed by said housing and including a sun gear, an orbit gear fixed to said housing, a planet gear carrier and planet gears borne by said carrier and permanently connecting the sun gear with the orbit gear, said case having a circumferentially toothed extension embracing the drive shaft and arranged for selective connection at times with said housing, said carrier and said sun gear, clutch teeth on said driven shaft arranged for selective connection with clutch teeth on said carrier and on said housing, said housing and the gear enclosed thereby being shiftable bodily together axially of said shafts, for driving the driven shaft at different speeds as influenced by the shifted position of the unit, said carrier including spaced and cross connected members embracing the driving and driven shafts respectively, cooperating means on one of said carrier members and on said case for locking the carrier to said case against rotation while the sun gear is locked to the driving shaft and the gear housing is locked to the driven shaft.

11. A power transmission as set forth in claim 5 in which said carrier includes a pair of axially spaced members connected for common rotation, on opposite sides of the sun gear, means for selectively locking one of the carrier members and the housing to said case when the unit is shifted in one direction, means for locking the housing to the driven shaft when said unit is shifted so as to lock the carrier to the case and means for simultaneously therewith locking the sun gear to the driven shaft, and a centrifugal clutch associated with each carrier member and including a driving member and a driven member, the driving member of one clutch arranged for driving connection with the driving shaft and free wheeling connection with the sun gear and driving connection with the associated driven member of the clutch when the clutch members are in synchronism, the driving member of the other clutch arranged for driving connection with the driven shaft and for free wheeling connection with the associated carrier member, the driven member of the second clutch being permanently connected with the sun gear.

12. In a power transmission mechanism, in combination with a motor having a stationary case and a driving shaft extended therefrom: a transmission unit bodily shiftable axially of the drive shaft and including a housing, a planetary gear set, a pair of centrifugal clutches each having a driving element arranged to be drivingly connected with the driving shaft and a driven element arranged for connection through said planetary gear set with the driven shaft, a free wheeling clutch drivingly connecting the driving element of each centrifugal clutch with the driving shaft, said planetary gear set including an orbit gear rotatable with said housing, a sun gear, a planet gear carrier including a pair of discs connected for corotation, and planet gears supported on said carrier for operatively connecting said sun and orbit gears, and a driven shaft coaxial with said drive shaft, said motor case having an externally toothed cylindrical extension telescoping said drive shaft, one disc of said carrier and an adjacent end wall of said housing having internal teeth arranged for selective engagement with the teeth on said extension when said transmission unit is axially shifted in opposite directions, said driven shaft having external teeth and a second end wall of said housing having internal teeth adapted to mesh only when said unit is shifted for engaging a carrier disc with said case extension, said driving and driven shafts having other sets of external clutch teeth and said sun gear, carrier and the driving members of said centrifugal clutches having sets of internal clutch teeth arranged for selective interconnection in response to the shifting of said unit for varying the torque applied to the driven shaft.

13. In a power transmission mechanism as set forth in claim 12, in which one of said carrier discs is operatively associated with and arranged to be driven by the driving member of one of said centrifugal clutches and said sun gear is drivingly connected with the driving member of the other centrifugal clutch.

14. In a power transmission mechanism, in combination with a motor having a stationary case and a driving shaft extended therefrom: a transmission unit bodily shiftable axially of the drive shaft and including a housing, a planetary gear set, a pair of centrifugal clutches each having a driving element arranged to be drivingly connected with the driving shaft and a driven element arranged for connection through said planetary gear set with the driven shaft, a free wheeling clutch drivingly connecting the driving element of each centrifugal clutch with the driving shaft, said planetary gear set including an orbit gear rotatable with said housing, a sun gear, a planet gear carrier including a pair of discs connected for corotation, and planet gears supported on said carrier for operatively connecting said sun and orbit gears, and a driven shaft coaxial with said drive shaft, said motor case having an externally toothed cylindrical extension telescoping said drive shaft, one disc of said carrier and an adjacent end wall of said housing having internal teeth arranged for selective engagement with the teeth on said extension when said transmission unit is axially shifted in opposite directions, said driven shaft having external teeth and a second end wall of said housing having internal teeth adapted to mesh only when said unit is shifted for engaging a carrier disc with said case extension, said driving and driven shafts having other sets of external clutch teeth and said sun gear, carrier and the driving members of said centrifugal clutches having sets of internal clutch teeth arranged for selective interconnection in response to the shifting of said unit for varying the torque applied to the driven shaft, the driving members of said centrifugal clutches being respectively arranged to free wheelingly drive said sun gear and a second carrier disc.

15. In a power transmission mechanism, in combination with a motor having a stationary case and a driving shaft extended therefrom: a transmission unit bodily shiftable axially of the drive shaft and including a housing, a planetary gear set, a pair of centrifugal clutches each having a driving element arranged to be drivingly connected with the driving shaft and a driven element arranged for connection through said planetary gear set with the driven shaft, a free wheeling clutch drivingly connecting the driving element of each centrifugal clutch with the driving shaft, said planetary gear set including an orbit gear rotatable with said housing, a sun gear, a planet gear carrier including a pair of discs connected for corotation, and planet gears supported on said carrier for operatively connecting said sun and orbit gears, and a driven shaft coaxial with said drive shaft, said motor case having an externally toothed cylindrical extension telescoping said drive shaft, one disc of said carrier and an adjacent end wall of said housing having internal teeth arranged for selective engagement with the teeth on said extension when said transmission unit is axially shifted in opposite directions, said driven shaft having external teeth and a second end wall of said housing having internal teeth adapted to mesh only when said unit is shifted for engaging a carrier disc with said case extension, said driving and driven shafts having other sets of external clutch teeth and said sun gear, carrier and the driving members of said centrifugal clutches having sets of internal clutch teeth arranged for selective interconnection in response to the shifting of said unit for varying the torque applied to the driven shaft, the driving members of said centrifugal clutches being respectively arranged to free wheelingly drive said sun gear and a second carrier disc, the driving members of said centrifugal clutches being respectively driven by the driving shaft and serving to drive the driven shaft when said unit is appropriately shifted.

16. In a power transmission mechanism as set forth in claim 12, in which one of said carrier discs is operatively associated with and arranged to be driven by the driving member of one of said centrifugal clutches and said sun gear is drivingly connected with the driving member of the other centrifugal clutch, and means for shifting said unit to differentially apply torque to the driven shaft and for reversing the direction of rotation thereof.

17. In a power transmission mechanism as set forth in claim 12, in which one of said carrier discs is operatively associated with and arranged to be driven by the driving member of one of said centrifugal clutches and said sun gear is drivingly connected with the driving member of the other centrifugal clutch, and means for shifting said unit to differentially apply torque to the driven shaft and for reversing the direction of rotation thereof, the connections between said drive shaft, said sun gear and the driving member of one of said centrifugal clutches being such that the sun gear will be positively driven, when the unit is shifted in one direction, and when shifted in an opposite direction the sun gear will be free wheelingly driven through the driving member of the then operative centrifugal clutch.

18. In a power transmission mechanism as set forth in claim 12, in which one of said carrier discs is operatively associated with and arranged to be driven by the driving member of one of said centrifugal clutches and said sun gear is drivingly connected with the driving member of the other centrifugal clutch, the connections between said shafts and said centrifugal clutches being such that when the driving members of said clutches are connected respectively with the driving and driven shafts by the shifting of the unit in one direction power will be applied to the driven shaft through the first clutch when the sun gear and finally through the second clutch.

REX E. KELLER.

REFERENCES CITED

The following references are of record in the file of this patent:

UNITED STATES PATENTS

| Number | Name | Date |
|---|---|---|
| 2,159,426 | Dunn | May 23, 1939 |
| 2,182,385 | Neracher | Dec. 5, 1939 |
| 2,218,813 | Cotterman | Oct. 22, 1940 |
| 2,248,492 | Cotterman | July 8, 1941 |
| 2,257,333 | Cotterman | Sept. 30, 1941 |
| 2,311,209 | Carnagua | Feb. 16, 1943 |

FOREIGN PATENTS

| Number | Country | Date |
|---|---|---|
| 5,835 | Great Britain | Mar. 11, 1907 |